(No Model.)
E. W. LOCKWOOD.
DEVICE FOR DRESSING MILLSTONES.
No. 324,392. Patented Aug. 18, 1885.
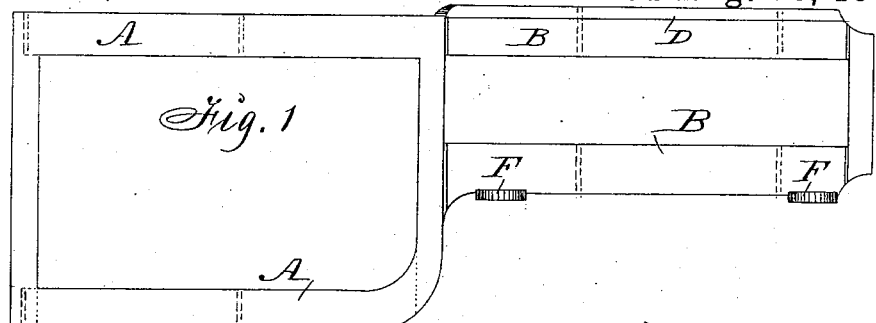
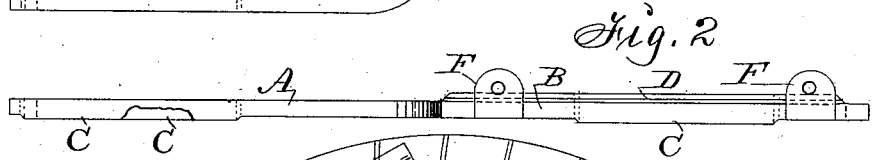
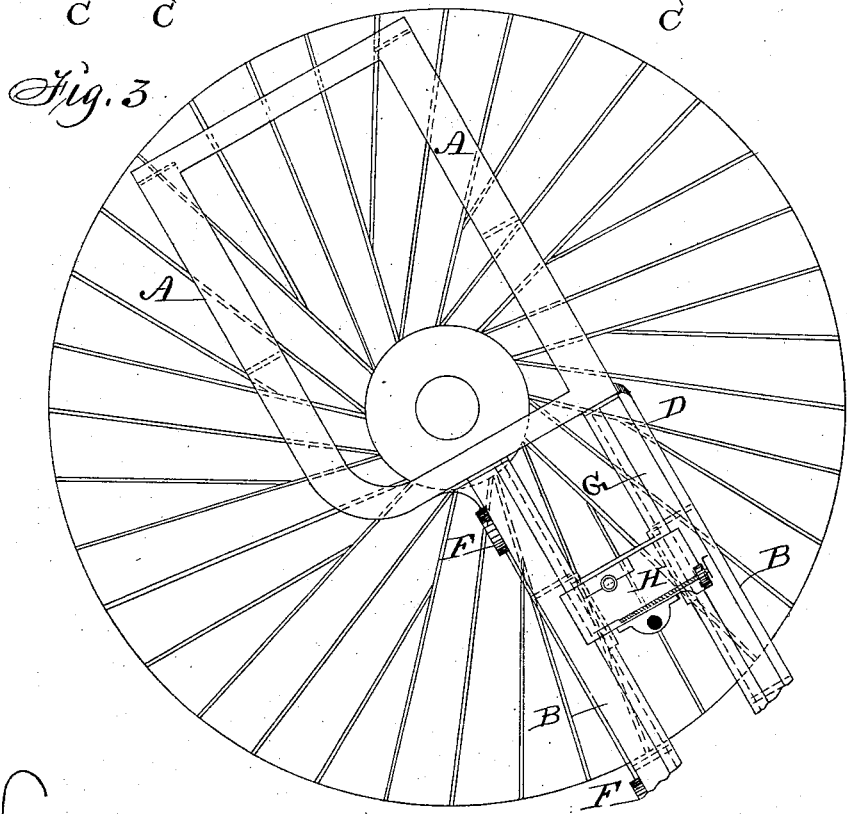

UNITED STATES PATENT OFFICE.

EDWIN W. LOCKWOOD, OF NEVADA, IOWA.

DEVICE FOR DRESSING MILLSTONES.

SPECIFICATION forming part of Letters Patent No. 324,392, dated August 18, 1885.

Application filed May 9, 1885. (No model.)

*To all whom it may concern:*

Be it known that I, EDWIN W. LOCKWOOD, a citizen of the United States of America, and a resident of Nevada, in the county of Story and State of Iowa, have invented a new and useful Improvement in Millstone-Dressers, of which the following is a specification.

My invention relates to that class of machines that are designed to be placed flat upon a millstone and adjusted at intervals, as required, to operate a diamond in a reciprocating carriage to dress the face and furrows of the stone.

Heretofore a frame of circular form, having a central opening to admit the spindle of the runner-stone or a bolt passed through the eye of the bed-stone, has had an extension and track upon which to operate a reciprocating carriage; but it is difficult to dress the face of a stone level, or to move the diamond in any direction desired relative to the axis of the stone, or the different angles of the furrows in the dress relative to each other, as required, to dress the entire surface evenly from the center to the circumference; and my object is to provide a base for supporting a carriage in such a manner that the base and carriage can be moved jointly around the axis of the stone, and also to and from the axis in any direction desired; and I accomplish the results contemplated as hereinafter set forth, pointed out in my claim, and illustrated in the accompanying drawings, in which—

Figure 1 is a top view of my portable frame and carriage-support; Fig. 2, a side elevation, and Fig. 3 a top view, of a millstone having one of my dressers in position thereon as required for practical use.

A represents the main portion of my portable frame and base cast complete in one piece. It is a four-sided oblong frame adapted to be passed over the spindle of a runner-stone and laid flat upon the face of the stone to support a dressing-machine, and also to be used as a proof-staff.

B is an extension and auxiliary frame, formed integral with the part A, to project horizontally and in the same plane from one side and corner of the inner end of the frame A.

C C, clearly shown in Fig. 2, represent long flat-bottomed feet formed integral with the parts A and B, and planed off, as required, to support the complete machine level on a level plane. Corresponding feet are required under the opposite edge of the complete frame, so that it will have four feet to rest upon.

D is a flange extending upward from the edge of the part B to engage the base of a dresser-machine.

F F are perforated and screw-threaded lugs on the part B, adapted to receive set-screws for the purpose of clamping the base of a dresser-machine fast against the flange D, to retain it fixed level upon the top of the frame, and, as required, to be moved jointly with my complete base.

G represents the base, and H the sliding carriage, of a dresser-machine in position as required for practical use upon a millstone.

From the description of the construction and function of each part of my complete portable frame and base its practical use and advantage will be obvious to all persons familiar with millstone-dressing machines.

I claim as my invention—

A portable base for millstone-dressing machines, consisting of a four-sided frame adapted to be passed over the spindle of a millstone, and an auxiliary frame extending from the end of the main frame, and provided with a flange at one side or edge, and screw-threaded lugs on the opposite edge for fastening the base of a dresser-machine, and elongated flat feet near the opposite ends of the complete device, substantially as and for the purposes stated.

EDWIN W. LOCKWOOD.

Witnesses:
T. J. ROSS,
T. E. ALDERMAN.